United States Patent [19]

Newton

[11] Patent Number: 5,210,926

[45] Date of Patent: May 18, 1993

[54] METHOD FOR FIXTURING A WORKPIECE

[75] Inventor: Orrin A. Newton, Northville, Mich.

[73] Assignee: Ford Motor Company, Dearborn, Mich.

[21] Appl. No.: 848,560

[22] Filed: Mar. 9, 1992

[51] Int. Cl.⁵ .............................................. B25B 1/00
[52] U.S. Cl. ........................................... 29/559; 269/7
[58] Field of Search ...................... 269/7; 51/319, 277; 29/239, 559

[56] References Cited

U.S. PATENT DOCUMENTS

| | | |
|---|---|---|
| 995,537 | 6/1911 | Hertner et al. |
| 3,790,152 | 2/1974 | Parsons. |
| 3,897,535 | 7/1975 | Lapac et al. |
| 3,921,343 | 11/1975 | Speyer. |
| 4,110,885 | 9/1978 | Fisher ............................. 269/7 |
| 4,685,660 | 8/1987 | Dillner ............................ 269/7 |

FOREIGN PATENT DOCUMENTS 776848  11/1980  U.S.S.R. .................................. 269/7

Primary Examiner—Robert C. Watson
Attorney, Agent, or Firm—Roger L. May; Joseph W. Malleck

[57] ABSTRACT

Disclosed are a method for fixturing and manufacturing a machined workpiece, an article of manufacture including, in combination, a workholder and a workpiece, and a core box used to form the workholder. The workholder preferably is made of a cured resin bonded sand mixture. The workpiece is placed within the core box. Then the uncured resin bonded sand mixture is packed about the workpiece in the core box and allowed to cure to form a frangible workholder for securing the workpiece. The core box may then be disassembled to release the workholder. The workholder next is positioned and affixed relative to a machining apparatus and machined. Mechanical forces, such as impact blows and/or abrading particles, such as sand or shot, are applied to the frangible workholder to disintegrate the workholder from about the machined workpiece.

19 Claims, 2 Drawing Sheets

METHOD FOR FIXTURING A WORKPIECE

TECHNICAL FIELD

The present invention relates generally to methods and apparatus for the fixturing of workpieces, and more particularly, to those utilizing matrix materials to form workholders for securing workpieces.

BACKGROUND ART

A workpiece of odd configuration is often difficult to machine, or to perform other like operations upon it, because of the difficulty in holding the workpiece relative to a machining apparatus due to the odd configuration. One solution to this problem is to solidify a meltable matrix material about the workpiece to form a workholder for supporting the workpiece. The workholder then is precisely held relative to a machining apparatus so that the workpiece can be accurately machined. Upon completion of the machining, the matrix material is heated above its melting point, and the workpiece is removed from the molten matrix material.

Conventionally, matrix materials used for fixturing are meltable at relatively low temperatures and include materials such as some metal alloys and organic compounds. The following are brief descriptions of references wherein methods and/or apparatus are used with meltable matrix materials to form workholders for supporting workpieces.

Speyer, U.S. Pat. No. 3,921,343, discloses hot melt compositions including thermoplastic resinoids for fixturing hard-to-hold fragile parts during machining. The resinoid is the reaction product of a methylolurea with a fatty acid.

Lapac et al. U.S. Pat. No. 3,897,535, describes a process for fixturing a workpiece by quenching a liquid resin. The process includes pouring a liquid organic resin to form a workholding material into a fluid tight vessel around a workpiece and quenching the assembly at between 40° F. and 73° F. to solidify the workholding material. Ceramic stones may be heated and placed within the vessel to heat the vessel and workpiece prior to receiving the liquid workholding material. The stones also provide increased holding strength for the workholding material and reduce shrinkage of the material during cooling.

Parsons, U.S. Pat. No. 3,790,152, teaches a chucking apparatus of the meltable matrix type. Molten matrix metal, preferably a eutectic alloy Ostalloy having a melting point of 158° F., is poured into the chucking apparatus and cooled to fixture a workpiece. To prevent the matrix metal from adhering directly to the metal workpiece, the surface of the workpiece may be first coated with a heat curable adhesive, which is cured by the heat of the cooling matrix metal.

Hertner et al, U.S. Pat. No. 995,537, shows a jig for holding articles, or workpieces, during machining. The jig receives a liquid alloy metal which is solidified to fixture a workpiece. Included in the jig are conduits for receiving steam and cold water which serve, respectively, to liquify and solidify the alloy metal.

These methods and apparatus for fixturing a workpiece within a meltable matrix material have a number of disadvantages. First, using meltable matrix materials requires the use of a heating source to liquify the material. Second, the energy supplied to the heating source increases the cost of the fixturing operation. Third, the meltable materials are often very expensive. Therefore, any replacement of lost materials also increases the cost of the fixturing operation.

Fourth, the vessel used to hold the material should be fluid tight during thermal cyling after repeated use. Fifth, the metal alloys or organic materials interact with, and may have deleterious effects on, the surface of the workpieces. This may be especially troublesome if the workpiece is made of a particularly reactive or sensitive alloy. The strength or working life of the workpiece may be reduced as a result of this interaction.

Sixth, it is often difficult to remove all of the meltable matrix material from the machined workpiece. Additional operations may be needed to cleanse the surface of the workpieces. Seventh, the heating and cooling may cause warpage or distortion of the workpiece. Also, the time needed to heat and cool the matrix materials can significantly increase the time necessary to complete the overall machining of a subject workpiece.

Special precautions to guard against health risks may be required. Conventional methods of fixturing can result in workers being burned by hot apparatus or by hot matrix materials. Additionally, the metal alloys or organic materials may be toxic and harmful to human health.

The present invention avoids many of these problems.

DISCLOSURE OF INVENTION

The present invention includes a method for manufacturing a machined workpiece, a core box or fixturing device used to form a workholder about the workpiece, and an article of manufacture including, in combination, the workholder and the workpiece.

The method for manufacturing a machined workpiece includes the following steps. First, a core box is provided having a locator surface and a first mixture receiving opening therein. A workpiece is positioned against the locator surface in the core box. Next, an uncured curable mixture is placed in the core box around the workpiece. The mixture requires no heating to cure and harden and is preferably a resin bonded sand mixture or the like. The mixture is then cured around the workpiece to form a workholder for securing the workpiece. Subsequently, the workholder and workpiece are positioned relative to a machining apparatus and the workpiece is machined. Finally, mechanical forces are applied to the workholder to disintegrate the workholder from the machined workpiece.

The step of applying mechanical forces to the workholder may include applying to the workholder a stream of abrading particles, such as sand or shot, or applying impact forces, such as hammer blows, or both.

The core box may include a second mixture receiving opening therein. The step of placing the uncured curable mixture in the core box around the workpiece may then include placing a portion of the mixture about a first side of the workpiece through the first mixture receiving opening. The core box is then turned upside down and another portion of the mixture is then placed through the second mixture receiving opening about an opposite second side of the workpiece. Preferably, the core box is provided with retaining means for preventing the uncured mixture from leaving the core box when the core box is turned upside down.

The core box may be releasable from around the workholder to separate the core box from the workholder. A positioning surface on the workholder may be prepared or may be formed directly on the workholder by the core box. This positioning surface should be adaptable to locate the workholder and workpiece relative to the machining apparatus so the workpiece can be accurately machined.

The article for use with the machining apparatus includes, in combination, a workpiece to be machined and a workholder for securing the workpiece. The workholder is made from a mixture which sufficiently surrounds and supports the workpiece to adapt and to hold the workpiece for machining. Preferably, the workholder has a positioning surface thereon which is adapted to be located relative to the machining apparatus so that the workpiece may be accurately machined. Preferably, the mixture should be sufficiently frangible when cured so that it can be substantially removed from the workpiece by applying mechanical forces thereto. Unlike using meltable matrix materials, the application of heat to the workholder is not necessary to apply or to remove the workholder relative to the workpiece.

A fixturing device or core box is used to contain the workholder for securing the workpiece. The core box comprises a peripheral wall for retaining the uncured mixture which is cured into a frangible self-supporting workholder. The peripheral wall has a locating surface adapted to position the workpiece in a predetermined relationship relative to the peripheral wall. The locating surface may be an aperture which is formed in the peripheral wall and is sized and configured to receive the workpiece. The peripheral wall may further include a retaining means for preventing the uncured mixture from releasing from the core box. The retaining means may include longitudinally and inwardly extending ridges. Also, preferably, the peripheral wall is adapted to be removed from around the workholder without damaging the workholder. Threaded connections may be provided to assemble and disassemble the peripheral wall relative to the workholder.

It is an object of the present invention to provide a workholder, for securing a workpiece to be machined, which is made from an uncured curable mixture which requires no heat to encapsulate, or to be removed from, a workpiece.

It is an additional object to provide a method of fixturing and machining a workpiece which is less expensive and less time consuming than use of a method employing meltable matrix materials.

It is another object to provide a workholder which affords low manufacturing costs.

It is yet another object to provide a workholder made from a material which is non-toxic, inexpensive, and readily available.

It is a further object to provide a workholder composed of a matrix material which is generally inert to metallic workpieces.

It is still yet another object to provide a workholder which is frangible and from which a workpiece may be separated by the application of mechanical forces to the workholder.

A further object is to provide a core box or fixturing device which can be used to form a workholder for securing a workpiece, the workholder being made of a frangible mixture of resin and sand, with the core box being removable from around the workholder.

Other objects, features, and advantages will become more readily apparent from the following description and accompanying sheet of drawings.

BEST MODE FOR CARRYING OUT THE INVENTION

Figure 1:
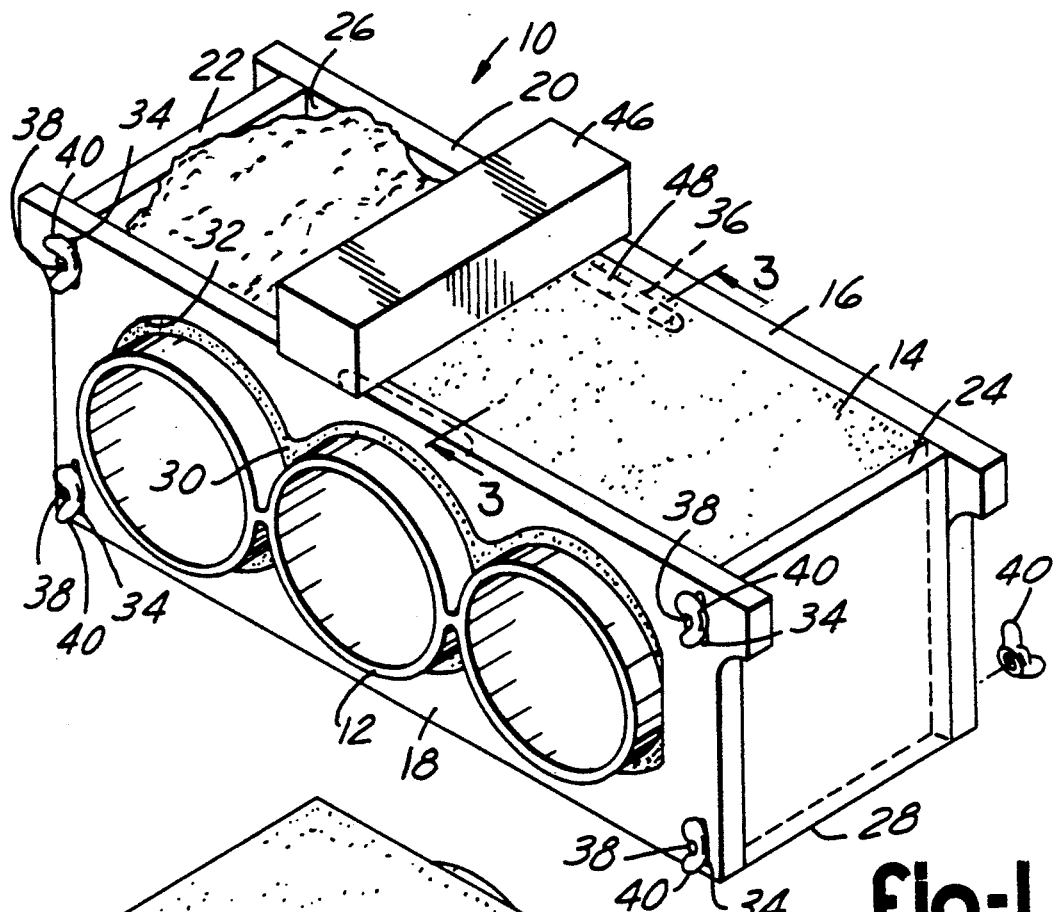
FIG. 1 is a perspective view of a core box having a workpiece positioned therein with an uncured curable mixture placed about the workpiece.

FIG. 1 shows a fixturing device or core box 10 supporting a workpiece 12 with a workholder 14 being formed thereabout.

Core box 10, in the preferred embodiment, has an enclosed peripheral wall 16. peripheral wall 16 is preferably rectangular in shape and includes parallel and opposing first and second planar side walls 18 and 20 and parallel and opposing planar first and second end walls 22 and 24. Peripheral wall 16 forms a first rectangular mixture receiving opening 26 and an opposing second mixture receiving opening 28.

Workpiece 12, as shown in this embodiment, is a cast iron cylinder liner, having a plurality interconnected cylinders. The liner, after machining, is to be cast within an aluminum block.

First side wall 18 has an aperture 30 formed therein which is sized and configured to receive workpiece 12 with the ends of the liner being exposed. Preferably, aperture 30 is slightly oversized relative to workpiece 12 thereby forming a gap 32 therebetween. Gap 32 should be sufficiently large to accommodate workpieces 12 having slightly different dimensions due to manufacturing tolerances. First side wall 18 also has four elongated slots 34 formed therein.

Figure 4:
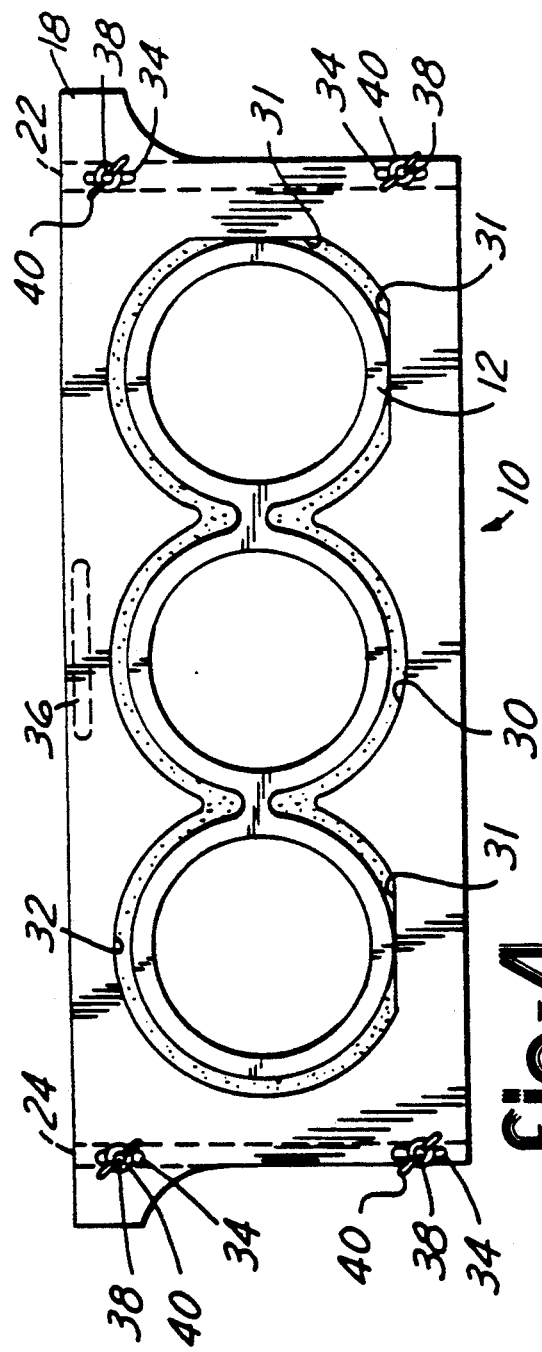
FIG. 4 is a side elevational view of the core box and workpiece.
Figure 3:
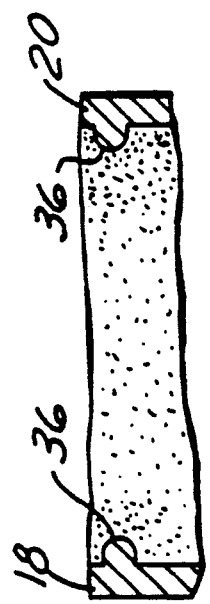
FIG. 3 is a fragmentary cross-sectional view taken along line 3—3 of FIG. 2.

As shown in FIGS. 3 and 4, near the top of first side wall 18 is a longitudinally and inwardly extending ridge 36 which serves as a retaining means for preventing workholder 14 from moving relative to core box 10. Second sidewall 20 is the mirror image of first sidewall 18 and also has corresponding aperture 30, locator surfaces 31, gap 32, plurality of slots 34 and opposing ridge 36 formed therein. Apertures 30 in sidewalls 18 and 20 also have planar locator surfaces 31, as best seen in FIG. 4, which are used to position or locate the workpiece 12 relative to the peripheral wall 16 of core box 10.

Side walls 22 and 24 each have two pairs of threaded studs 38 which extend in the same plane as the associated side wall 22, 24 and which are positioned to be received through slots 34 of first and second sidewalls 18 and 20. Nuts 40 secure the threaded studs 38 in relation to the slots 34 to cooperatively secure sidewalls 18 and 20 to end walls 22 and 24, thereby forming an enclosed rectangular peripheral wall 16. Wing nuts 40 are easily fastened and unfastened to quickly assemble and disassemble core box 10.

Figure 2:
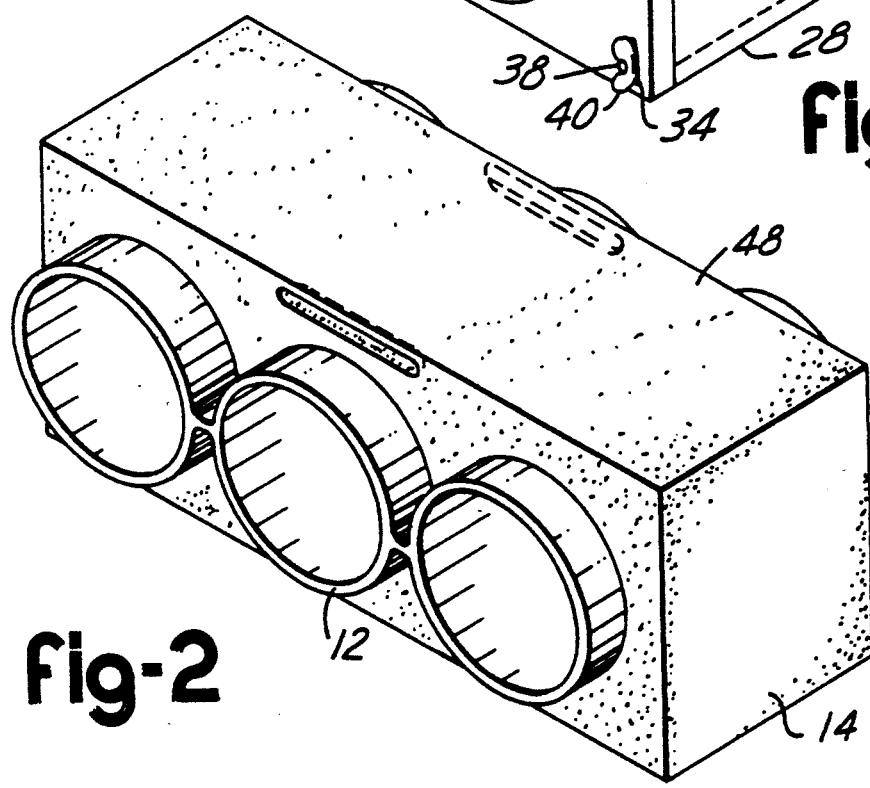
FIG. 2 is a perspective view of a workholder for securing the workpiece.

FIG. 2 shows a resulting article 42 of manufacture including workpiece 12 and workholder 14 which has been released from core box 10.

In operation, workpiece 12 is placed within aperture 30 and against locator surfaces 31 to positively position workpiece 12 relative to side walls 18 and 20. End walls 22 and 24 are then secured to sidewalls 18 and 20 by fastening wing nuts 40 to threaded studs 38 to form enclosed peripheral wall 16.

An uncured curable mixture 44 is then placed in core box 10 around the workpiece 12. Mixture 44 is ideally a resin bonded sand. In the preferred embodiment, the sand is a #2 grade silicate sand originating from Ludington, Michigan and sold by Sargeant Sand, Inc., of Saginaw, Mich. The resin is a combination of solutions, including pepsets #3500, #1600, and #2610, which are sold by the Ashland Chemical Co. of Columbus, Ohio. A first mixture of 8 ounces of pepset #3500 and 5 gallons of pepset #1600 are combined with sand in a ratio of 4.2 ounces of the combined pepsets to each 100 lbs of sand. Then, a separate second mixture of pepset #2610 and sand is blended together, again at 4.2 ounces of this pepset per 100 lbs of sand. Until the first and second mixtures are combined, no hardening of either of the mixtures occurs. The first and second mixtures then are intermixed to form a resin bonded sand mixture 44 which cures in about five minutes.

Preferably, the uncured curable mixture 44 is packed about the top or upper side of workpiece 12 and filled flush up to first mixture-receiving opening 26. A bar 46 then is slid across first mixture receiving opening 26 to form a first planar positioning surface 48.

Mixture 44 is similar in consistency to damp sand that might be used to build a sand castle at a beach. Therefore, it is preferable to fill in any voids located at a bottom side of workpiece 12. To accomplish this, core box 10 is inverted. The pair of opposing ridges 36 prevent the mixture 44, which is solidifying into workholder 14, from leaving the core box 10 when it is turned upside down. More of mixture 44 is then placed atop the bottom side of workpiece 12, which is now upwardly facing. Preferably, bottom mixture-receiving opening 28 also is scraped flush with bar 46 to form a second planar positioning surface 50.

The mixture 44 then is allowed to cure for approximately five minutes at an ambient temperature. At the end of this time, mixture 44 will have cured and solidified to form a frangible rectangular workholder 14 for supporting workpiece 12. Core box 10 then is disassembled by removing the plurality of wing nuts 40 from associated studs 38 and separating side walls 18 and 20 and end walls 22 and 24 away from workholder 14.

Figure 5:
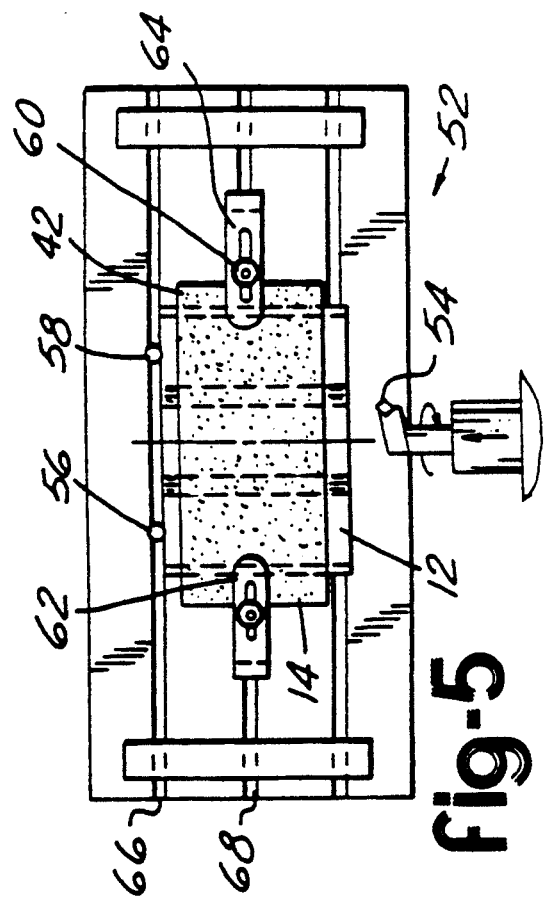
FIG. 5 is a top view of a machining apparatus with the workholder and workpiece being secured thereto.

Article 42, which includes workpiece 12 and workholder 14, then is transferred to a machining apparatus 52, as shown in FIG. 5. Article 42 is placed atop a planar surface on machining apparatus 52 and orientated relative to boring tool 54 so that the inner bores of workpiece 12 may be machined. Workpiece 12 is located positively using vertically extending locating pins 56, 58 and 60 and held in position by longitudinally spaced clamps 62 and 64. The locating pins 56, 58 and 60 and clamps 62 and 64 are slidably secured within T-slots 66 and 68 as shown in FIG. 5. Tool 54 is moved longitudinally so that each of the bores of workpiece 12 may be machined.

It has been found that the combination of the weight of the article 42 and the inherent dampening characteristics of resin bonded sand mixture 44 assists in reducing the chatter and distortion of supported workpiece 12, in contrast to not using workholder 14, when the machining of workpiece 12 is being performed. Also, the chatter and distortion is reduced relative to using a workholder made from a metallic meltable matrix material. Therefore, the accuracy of the machining and the quality of machined workpiece 12 is enhanced using the above described apparatus and method.

After workpiece 12 is machined, workholder 14 is removed from around workpiece 12. This is accomplished by applying mechanical forces to the workholder 14 to disintegrate it from the machined workpiece 12. Preferably, this is accomplished by applying impact forces to the workholder, such as hammer blows, to remove the majority of workholder from the workpiece 12. A stream of abrasive particles, such as sand or metal shot, then is applied to remove any remnants of the workholder 14.

The objects of this invention, as recited earlier, have thus been accomplished.

A workholder for securing or fixturing a workpiece has been formed with a curable mixture of resin and sand. This workholder requires no heat to solidify, or to be removed from a workpiece. Also, the workholder is made of a mixture which is non-toxic and costs only pennies per pound to make. The workholder does not affect adversely metallic surfaces as do many of the prior art meltable matrix materials. Also, the mixture sets up quickly, reducing the time needed to form the workholder, relative to using meltable alloys or organic compounds which need to be heated and cooled.

The core box has been designed to contain a resin and sand mixture forming a workholder for securing a workpiece in a fixed position relative to the core box. The core box may be easily and quickly disassembled to release the workholder and workpiece therefrom.

While in the foregoing specification this invention has been described in relation to certain preferred embodiments thereof, and many details have been set forth for the purpose of illustration, it will be apparent to those skilled in the art that the invention is susceptible to additional embodiments and that certain details described herein can be varied considerably without departing from the basic principles of the invention. For example, the workpiece could be of any shape. It is therefore within the scope of this invention to use a core box of a different configuration. The core box need only locate the workpiece in some fixed relationship thereto and retain the uncured curable mixture so that it cures supporting the workpiece. Also, it is envisioned that operations which require fixturing of oddly shaped parts, other than machining, are also within the scope of this invention.

I claim:

1. A method for manufacturing a machined workpiece comprising the steps of:
   providing a core box with a locator surface and at least a first mixture receiving opening therein;
   positioning a workpiece against the locator surface in the core box;
   placing an uncured curable mixture in the core box through the first mixture receiving opening around the workpiece;
   curing the mixture around the workpiece to form a workholder for securing the workpiece;
   positioning the workholder relative to a machining apparatus
   machining the workpiece; and
   applying mechanical forces to the workholder to remove the workholder from the machined workpiece;
   wherein the curing step and the removal step are performed free of the application of heat from an exogenous source.

2. A method for manufacturing a machined workpiece comprising the steps of:
providing a core box with a locator surface and at least a first mixture receiving opening therein;
positioning a workpiece against the locator surface in the core box;
placing an uncured curable mixture in the core box through the first mixture receiving opening around the workpiece;
curing the mixture around the workpiece to form a workholder for securing the workpiece;
positioning the workholder relative to a machining apparatus;
machining the workpiece; and
applying a stream of abrading particles to the workholder to disintegrate the workholder from the machined workpiece.

3. The method of claim 2 wherein:
the applying a stream of abrading particles includes providing sand or shot as the abrading particles.

4. The method of claim 1 wherein:
the step of applying mechanical forces to the workholder includes applying impact forces to the workholder.

5. The method of claim 4 wherein:
the step of applying mechanical forces the workholder further includes applying a stream of abrading particles.

6. The method of claim 1 wherein:
the core box has a second mixture receiving opening opposite the first mixture receiving opening; and
the step of placing the uncured curable mixture in the core box around the workpiece includes:
placing, through the first mixture receiving opening, a portion of the mixture about a first side of the workpiece;
inverting the core box; and
placing, through the second mixture receiving opening, another portion of the mixture about an opposite second side of the workpiece.

7. The method of claim 6 further including the step of:
providing retaining means for preventing the uncured mixture from leaving the core box when the core box is inverted.

8. The method of claim 1 further including the step of:
removing the core box from around the workholder to separate the core box from the workholder.

9. The method of claim 1 further including the step of:
preparing a positioning surface on the workholder, the positioning surface being adapted to locate the workholder and the workpiece relative to the machining apparatus so that the workpiece can be accurately machined.

10. A method for manufacturing a machined workpiece comprising the steps of
providing a core box with a locator surface and at least a first mixture receiving opening therein;
positioning a workpiece against the locator surface in the core box;
mixing a curable resin and sand to create an uncured curable mixture;
placing the uncured curable mixture in the core box through the fist mixture receiving opening around the workpiece;
curing the mixture around the workpiece to form a workholder for securing the workpiece;
positioning the workholder relative to a machining apparatus;
machining the workpiece; and
applying mechanical forces to the workholder to disintegrate the workholder from the machined workpiece.

11. The method of claim 2 further including the step of:
providing the core box with a second mixture receiving opening opposite the first mixture receiving opening; and
the step of placing the uncured curable mixture includes:
placing, through the first mixture receiving opening, a portion of the mixture about a first side of the workpiece;
inverting the core box; and
placing, through the second mixture receiving opening, another portion of the mixture about an opposite second side of the workpiece.

12. The method of claim 11 further including the step of:
providing retaining means for preventing the uncured mixture from leaving the core box when the core box is inverted.

13. The method of claim 2 further including the step of
removing the core box from around the workholder to separate the core box from the workholder.

14. The method of claim 12 further including the step of:
preparing a positioning surface on the workholder, the positioning surface being adapted to locate the workholder and the workpiece relative to eh machining apparatus so that the workpiece can be accurately machined.

15. The method of claim 10 wherein:
the step of applying mechanical forces to the workholder includes applying impact forces to the workholder.

16. The method of claim 10 wherein:
the step of applying mechanical forces to the workholder includes applying a stream of abrading particles.

17. The method of claim 16 wherein:
the step of applying a stream of abrading particles includes providing sand or shot as the abrading particles.

18. The method of claim 10 further including the step of:
providing the core box with a second mixture receiving opening opposite the first mixture receiving opening; and
the step of placing the uncured curable mixture includes:
placing, through the first mixture receiving opening, a portion of the mixture about a first side of the workpiece;
inverting the core box; and
placing, through the second mixture receiving opening, another portion of the mixture about an opposite second side of the workpiece.

19. The method of claim 18 further including the step of:
providing retaining means for preventing the uncured mixture from leaving the core box when the core box is inverted.

* * * * *